(12) United States Patent
Young et al.

(10) Patent No.: US 9,058,454 B1
(45) Date of Patent: Jun. 16, 2015

(54) METHOD AND APPARATUS TO REDUCE POWER SEGMENTATION OVERHEAD WITHIN AN INTEGRATED CIRCUIT

(75) Inventors: Steven P. Young, Boulder, CO (US);
James Karp, Saratoga, CA (US);
Michael J. Hart, Palo Alto, CA (US)

(73) Assignee: XILINX, INC., San Jose, CA (US)

( * ) Notice: Subject to any disclaimer, the term of this patent is extended or adjusted under 35 U.S.C. 154(b) by 1134 days.

(21) Appl. No.: 12/570,637

(22) Filed: Sep. 30, 2009

(51) Int. Cl.
*G06F 17/50* (2006.01)
*G06F 9/455* (2006.01)

(52) U.S. Cl.
CPC ........ *G06F 17/5068* (2013.01); *G06F 17/5072* (2013.01); *G06F 17/5045* (2013.01); *G06F 17/505* (2013.01)

(58) Field of Classification Search
CPC ............ G06F 17/5045; G06F 2217/78; G06F 17/505; G06F 1/3202; G06F 17/5068; G06F 17/5072; G06F 17/5077
USPC ................................................. 716/120, 133
See application file for complete search history.

(56) References Cited

U.S. PATENT DOCUMENTS

| 5,880,598 | A * | 3/1999 | Duong ............................ 326/41 |
| 7,086,019 | B2 * | 8/2006 | Keller et al. .................. 716/109 |
| 7,200,830 | B2 * | 4/2007 | Drost et al. .................... 716/111 |
| 7,279,926 | B2 * | 10/2007 | Severson et al. ................ 326/33 |
| 7,386,824 | B2 * | 6/2008 | Porter et al. .................... 716/122 |
| 8,228,684 | B2 * | 7/2012 | Losavio et al. ............... 361/803 |
| 2004/0188811 | A1 * | 9/2004 | Vandentop et al. ........... 257/678 |
| 2006/0031692 | A1 * | 2/2006 | Kato et al. ..................... 713/300 |
| 2008/0086710 | A1 * | 4/2008 | Huynh et al. ................... 716/11 |
| 2008/0278923 | A1 * | 11/2008 | Losavio et al. ............... 361/803 |
| 2009/0066164 | A1 * | 3/2009 | Flynn et al. .................... 307/112 |
| 2010/0174923 | A1 * | 7/2010 | Houlihan et al. ............. 713/300 |

* cited by examiner

*Primary Examiner* — Stacy Whitmore
*Assistant Examiner* — Magid Dimyan
(74) *Attorney, Agent, or Firm* — Michael T. Wallace; Gerald Chan; LeRoy D. Maunu

(57) ABSTRACT

A method and apparatus to provide a power segmentation architecture that substantially eliminates the routing and area penalties associated with conventional power segmentation architectures. Power switching components are configured within the external interconnect portion of the integrated circuit (IC) to reduce the number of inter-layer interconnects that must be traversed in order to programmably supply operational power to the various device segments of the IC. A system-in-package (SIP) integration approach is alternately taken, whereby the power switching components utilized within the power segmentation architecture are conveniently allocated among the base or stacked die to reduce the number of inter-layer interconnects. The power switching components may also be implemented off-chip as discrete switching components such as a transistor or a micro-miniature switch/relay.

18 Claims, 5 Drawing Sheets

METHOD AND APPARATUS TO REDUCE POWER SEGMENTATION OVERHEAD WITHIN AN INTEGRATED CIRCUIT

FIELD OF THE INVENTION

The present invention generally relates to integrated circuits, and more particularly to a method and apparatus to reduce the power segmentation overhead utilized within the integrated circuits.

BACKGROUND

Advances in the semiconductor industry continue to demand the development of more powerful integrated circuits (ICs). As a result, device feature sizes continue to be scaled downward, thereby increasing the speed of the devices as well as the device density that may be exhibited by the integrated circuit. Multilayer structures have been simultaneously developed to allow for increasingly complex interconnect systems to be employed, so that the advanced devices may be interconnected for enhanced performance and system functionality.

In particular, multilayer structures separated by interlayer dielectrics (ILDs) are generally utilized to implement an interconnect system within an IC. Holes opened in the ILD layer(s) allow a metallization layer to extend to other metallization layers thereby producing conductive interlayer interconnects commonly referred to as vias. Variable-depth vias may also be implemented within the multilayer ICs, so as to allow the interconnection between conductive layers that exist at varying depths with respect to one another.

A chemical vapor deposition (CVD) process is typically utilized to deposit a layer of metal, e.g., tungsten (W), over each ILD layer to fill the vias previously formed within the ILD layer. The blanket film of tungsten over each ILD layer may then be removed from the planar surface, e.g., by etching or chemical-mechanical polishing (CMP), thereby leaving only the metallized vias, i.e., tungsten plugs. Typically, a first interconnect layer of the multilayer IC is formed using a single damascene structure, whereby a dielectric layer is deposited over the ILD & W layers, followed by formation of interconnect trenches and filling of these trenches with metal during a metal deposition step. A subsequent CMP process is then utilized to remove the excess metal to form a planar structure having metallized inlays (this is referred to as the single damascene process).

The remaining layers of a multi-level interconnect structure are typically formed using a so-called "dual-damascene structure," where only a single metallization step is used to simultaneously form the metallized interconnect as well as the metallized vias or plugs. In particular, the vias and interconnect trenches are formed on each layer and then simultaneously filled with metal during a metal deposition step. A subsequent CMP process is then utilized to remove the excess metal to form a planar structure having metallized inlays and metallized vias.

Turning to FIG. 1A, a cross-section of a multi-level interconnect structure is illustrated, whereby the various layers of a semiconductor die are implemented using the, e.g., single/dual damascene processes as discussed above. In particular, interconnect layers 102-110 represent an integer number, N, of interconnect layers that may exist within a multi-layer semiconductor die. A corresponding number of ILD layers 112-120 also exist, whereby the blank portions of ILD layers 112-120 represent dielectric regions utilized to insulate one interconnect layer from another.

The cross-hatched portions of ILD layers 112-120 represent a cross-section of the metallized vias, or plugs, that provide inter-layer connectivity, while the cross-hatched portions of interconnect layers 102-110 represent a cross-section of the metallized interconnect traces that provide intra-layer conductivity. As such, signals propagating on, e.g., interconnect layer 102, may traverse interconnect layers, e.g., 104-108, using the corresponding interconnect traces and vias of ILD layers, e.g., 112-118, to propagate to interconnect layer, e.g., 110.

Such a multi-level interconnect structure may be utilized within the IC of FIG. 1B, whereby conductive metallization layer 122 may receive signal 140 for propagation to component 124 using signal path 126, where signal path 126 traverses the multi-level interconnect structure as discussed above in relation to FIG. 1A. Component 124 may then be made conductive to propagate signal 140 through signal path 134 through each of the various layers of the multi-level interconnect structure as illustrated. Component 128 may also be made conductive to similarly propagate signal 140 using signal paths 136-138 as shown.

The IC of FIG. 1B may, therefore, be suited for an application known as power segmentation, whereby components 124 and 128 may represent power switching components to selectively propagate operational power throughout the IC as necessary. In such an instance, conductive metallization layer 122 may represent a global power supply plane to receive signal 140, which represents the operational power signal provided by an external power supply (not shown) that may be utilized by the semiconductor die during normal operating conditions. Each of components 124 and 128 may then be made selectively conductive to propagate operational power signal 140 from conductive metallization layer 122 throughout the IC as necessary.

Should the IC of FIG. 1B represent a programmable logic device (PLD), such as a field programmable gate array (FPGA), certain logic portions within the IC may remain unused, i.e., non-configured. Operational power to the unused logic, therefore, need not be supplied. As such, power switch, e.g., 128, may be made non-conductive to deprive the unused logic portions that are electrically coupled to signal path 138 of operational power. Alternately, the IC of FIG. 1B may represent a device that exhibits a "power-save" mode, whereby portions of the IC may be deprived of operational power during the power-save mode, i.e., by using the non-conductive attributes of power switch elements 124 and 128 to prohibit propagation of the operational power signal and thereby reducing the power consumption.

As can be seen by inspection of FIG. 1B, however, implementation of power segmentation requires that sufficient conductive traces and inter-layer vias be implemented within the multi-level interconnect structure of the IC to achieve the programmable propagation paths that are required by a power segmentation implementation. For example, sufficient conductive traces and inter-layer vias are required to first propagate operational power signal 140 received at conductive metallization layer 122 of external interconnect portion 130 to semiconductor device implementation portion 132 using signal path 126. Power switching component 124 may then be utilized to propagate the operational power signal vertically upward through the multi-level interconnect structure of the IC using signal path 134, so as to provide operational power to the corresponding interconnected logic segments that receive operational power from signal path 134.

Should other logic segments require operational power, then power switching component 128 may be utilized to receive the operational power signal from conductive metallization layer 122 via signal path 136 and then provide the operational power signal upward through the multi-level interconnect structure of the IC, so as to provide operational power to the corresponding logic segment that receives operational power from signal path 138. Other logic segments (not shown) within the multi-level interconnect structure may receive operational power in a similar manner.

As can be seen, therefore, power segmentation using the multi-level interconnect structure of FIG. 1B has several disadvantages. First, power switching components 124 and 128 are typically implemented with feature sizes that are several orders of magnitude larger than core logic components and, therefore, require a significant portion of semiconductor die area for their implementation. For example, the width of transistors utilized to implement switching components 124 and 128 may be several hundreds to several thousands of microns, so as to minimize the on-resistance of the transistors, thereby minimizing the drop in operational voltage magnitude that they provide. As such, a significant amount of semiconductor die area is consumed by power switching components 124 and 128, which could otherwise be used by other core logic functions implemented within semiconductor device implementation portion 132.

A routing penalty is also realized by the multi-level interconnect structure of FIG. 1B. In particular, each operational power signal that is to be provided to each logic segment within the IC must traverse at least two vertical paths through the IC; a first path to propagate the operational power signal from the external interconnect portion 130 to the semiconductor device implementation portion 132, and a second path to propagate the operational power signal from the semiconductor device implementation portion 132 to the logic segment that requires the operational power signal. Such a vertically implemented interconnect, however, may well be in conflict with the data and clock lines that may be predetermined within the IC, such as is the case with a PLD. In addition, an area penalty is also sustained, since the interconnect traces and inter-layer vias each require a portion of semiconductor area on each layer of the multi-level interconnect structure of FIG. 1B.

Efforts continue, therefore, to provide power segmentation architectures that would otherwise be impossible, or at least prohibitively costly, to implement within complex ICs such as PLDs.

SUMMARY

To overcome limitations in the prior art, and to overcome other limitations that will become apparent upon reading and understanding the present specification, various embodiments of the present invention disclose a method and apparatus for the reduction of power segmentation interconnect within an integrated circuit In accordance with one embodiment of the invention, a method of reducing power segmentation overhead within an integrated circuit comprises relocating power switching components from a semiconductor device implementation portion of the integrated circuit to an external interconnect portion of the integrated circuit. The external interconnect portion is located on a side opposite the semiconductor device implementation portion of the integrated circuit. The method further comprises providing operational power signals to the power switching components and programming the power switching components to selectively propagate the received operational power signals to portions of the integrated circuit.

In this embodiment, components implemented within the external interconnect portion of the integrated circuit can exhibit larger geometric dimensions relative to the geometric dimensions of components implemented within the semiconductor device implementation portion of the integrated circuit. The integrated circuit can be implemented within a single-die package. The providing operational power signals to the power switching components can comprise configuring the power switching components to receive the operational power signals from the external interconnect portion of the integrated circuit. Programming the power switching components to selectively propagate the received operational power signals can comprise programming the power switching components as non-conductive components to deprive portions of the integrated circuit of the operational power signals.

In this embodiment, programming the power switching components to selectively propagate the received operational power signals can further comprise programming the power switching components as conductive components to supply portions of the integrated circuit with the operational power signals. The integrated circuit can be implemented within a multiple-die package. Providing operational power signals to the power switching components can comprise propagating the operational power signals to the external interconnect portion of the integrated circuit using through-die vias of a base die of the multiple-die package. Providing operational power signals to the power switching components can comprise configuring the power switching components to receive the operational power signals from the external interconnect portion of the integrated circuit. Programming the power switching components to selectively propagate the received operational power signals can comprise: programming the power switching components as non-conductive components to deprive portions of the integrated circuit of the operational power signals; and programming the power switching components as conductive components to supply portions of the integrated circuit with the operational power signals.

In accordance with another embodiment of the invention, a method of reducing power segmentation overhead within an integrated circuit package comprises removing power switching components from a first semiconductor die of the integrated circuit package, relocating the power switching components to a location that is external to the first semiconductor die, providing operational power signals to the power switching components, and programming the power switching components to propagate the received operational power signals to portions of the first semiconductor die in response to a power segmentation algorithm.

In this embodiment, relocating the power switching components to a location that is external to the first semiconductor die can comprise relocating the power switching components to a second semiconductor die of the integrated circuit package. Providing operational power signals to the power switching components can comprise: applying the operational power signals to the second semiconductor die; and propagating the operational power signals to the first semiconductor die using through-die vias of the second semiconductor die. Providing operational power signals to the power switching components can comprise configuring the power switching components to receive the operational power signals from an external interconnect portion of the integrated circuit package. Programming the power switching components to selectively propagate the received operational power signals can comprise: programming the power switching components as non-conductive components to deprive portions of the first semiconductor die of the operational power signals in response to the power segmentation algorithm; and programming the power switching components as conductive components to supply portions of the first semiconductor die with the operational power signals in response to the power segmentation algorithm.

In this embodiment, relocating the power switching components to a location that is external to the first semiconductor die can comprise: discretely allocating the power switching components within the integrated circuit package; configuring the first semiconductor die to receive the operational power signals; and configuring the power switching components to receive the operational power signals from the first semiconductor die. Programming the power switching components to selectively propagate the received operational power signals can comprise: programming the power switching components as non-conductive components to deprive portions of the first semiconductor die of the operational power signals in response to the power segmentation algorithm; and programming the power switching components as conductive components to supply portions of the first semiconductor die with the operational power signals in response to the power segmentation algorithm.

In accordance with another embodiment of the invention, a semiconductor die package comprises a plurality of power switching components that are coupled to receive operational power signals and are configured to selectively provide the operational power signals in response to a corresponding plurality of control signals and a first semiconductor die having a plurality of logic segments implemented therein. The plurality of device segments are coupled to the plurality of power switching components and are configured to perform functions in response to receiving the selectively provided operational power signals. A first logic region implementing the plurality of power switching components is separated from a second logic region implementing the plurality of device segments.

In this embodiment, the region implementing the plurality of power switching components can be implemented within the first semiconductor die, where the first and second regions are on opposite sides of the first semiconductor die. The region implementing the plurality of power switching components can be implemented within a second semiconductor die.

BRIEF DESCRIPTION OF THE DRAWINGS

Various aspects and advantages of the invention will become apparent upon review of the following detailed description and upon reference to the drawings in which.

DETAILED DESCRIPTION

Generally, various embodiments of the present invention provide a power segmentation architecture that substantially eliminates the routing and area penalties associated with conventional power segmentation architectures. In one embodiment, for example, power switching components are configured within less densely populated areas of a multi-layer semiconductor die, e.g., the external interconnect portion of the semiconductor die. As such, realization of the power switching components becomes less difficult and commensurately less costly to implement. Semiconductor die area previously utilized for the power switching components is, therefore, simultaneously reallocated to core logic functions of the functional design of the integrated circuit (IC). In addition, the revised location of the power switching components reduces the number of inter-layer interconnects that must be traversed in order to programmably supply operational power to the various logic segments of the IC.

In an alternate embodiment, a system-in-package (SIP) integration approach is taken, whereby the power switching components utilized within the power segmentation architecture are removed from the semiconductor die that is subject to power segmentation. In such instances, a multi-chip package is implemented whereby, e.g., a base/stacked die implements the power switching functions for, e.g., a stacked/base die, respectively, that is subject to power segmentation. In alternate SIP embodiments, the stacked die may instead implement the power switching functions that facilitate the power segmentation within the stacked die, where the global power supply inputs are received from the base die using through-die vias (TDVs) contained within the base die.

In yet other embodiments, the power switching components may be discrete switching components that are included within the semiconductor die package or otherwise mounted to a surface of the semiconductor die that is subject to power segmentation. In such instances, the power switching components may be discretely implemented by programmable switching components, such as a transistor or a micro-miniature switch, e.g., a microelectromechanical system (MEMS) relay/switch.

Figure 2:
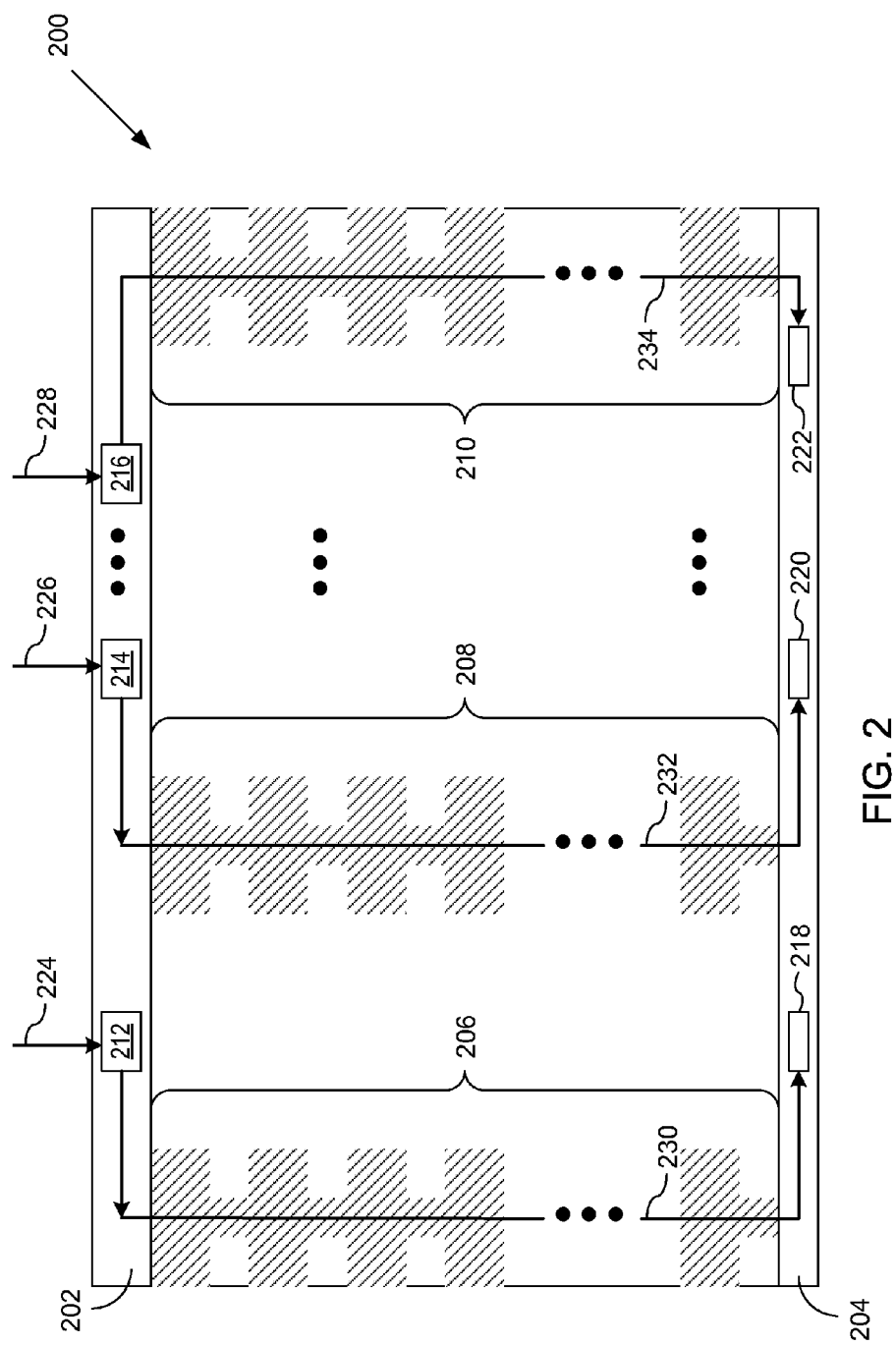
FIG. 2 illustrates a cross-section of a multi-level interconnect structure having reduced power segmentation interconnect in accordance with one embodiment of the present invention.

Turning to FIG. 2, a cross-section of a multi-layer interconnect structure of IC 200 is illustrated in accordance with one embodiment of the present invention. The interconnect structure of FIG. 2 is illustrated as being simplified for clarity, such that the inter-layer interconnects 206-210 are vertically stacked one right over the other, but it is understood that virtually any vertical interconnect arrangement may be utilized.

External interconnect portion 202 is adapted to accept external signal(s) 224-228, e.g., operational power signals, and route them throughout IC 200 as required. In contradistinction to the interconnect structure of FIG. 1B, switching components 212-216 are relocated from semiconductor device implementation portion 204 to external interconnect portion 202, such that the need to route signal(s) 224-228 vertically downward via signal paths 230-234, respectively, to the power switching components is obviated. Accordingly, the geometrically challenging features of switching components 212-216 may be removed from semiconductor device implementation portion 204 and implemented instead within external interconnect portion 202, where such geometrically challenging features may be readily constructed with greater simplicity and lower overall cost.

External interconnect portion 202 facilitates the receipt of signals 224-228 via switching components 212-216, respectively, whereby switching components 212-216 may be programmably configured (via control signals not shown) to route signals 224-228 to signal paths 230-234, thereby providing operational power to logic device segments 218-222. Alternately, switching components 212-216 may be programmably configured (via control signals not shown) to prohibit signals 224-228 from propagating to signal paths 230-234, so that logic device segments 218-222 that derive operational power from signal paths 230-234, respectively, may be deprived of operational power during, e.g., a power-save mode or while the logic devices are in a non-configured state.

It is understood that switching components 212-216 may be individually configured to selectively propagate signals 224-228 to signal paths 230-234, respectively. As a result, logic device segments 218-222 that are electrically coupled to vertical interconnect structures 206-210 may selectively receive the operational power signals that are provided by vertical interconnect structures 206-210.

Figure 1A:
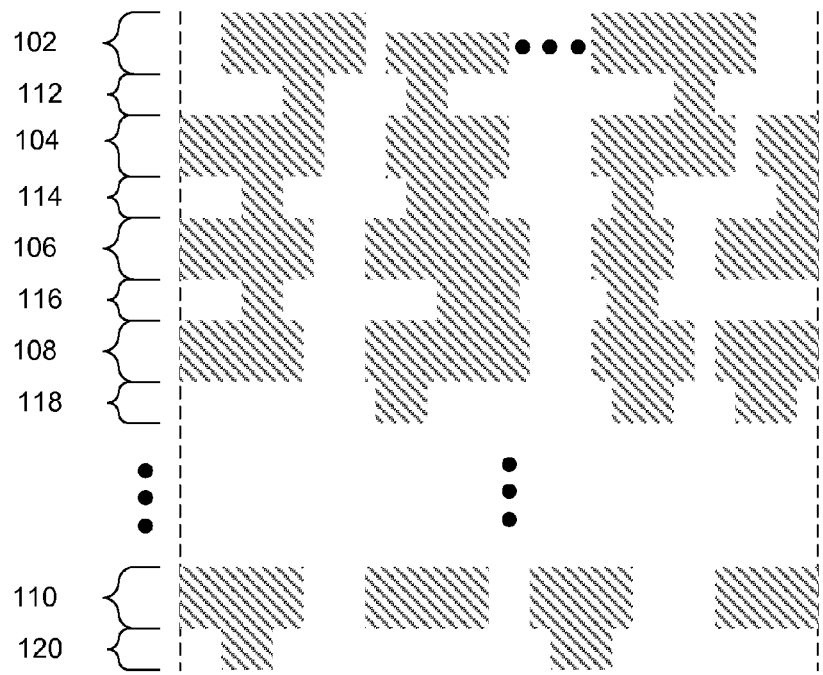
FIG. 1A illustrates a cross-section of a prior art multi-level interconnect structure.
Figure 1B:
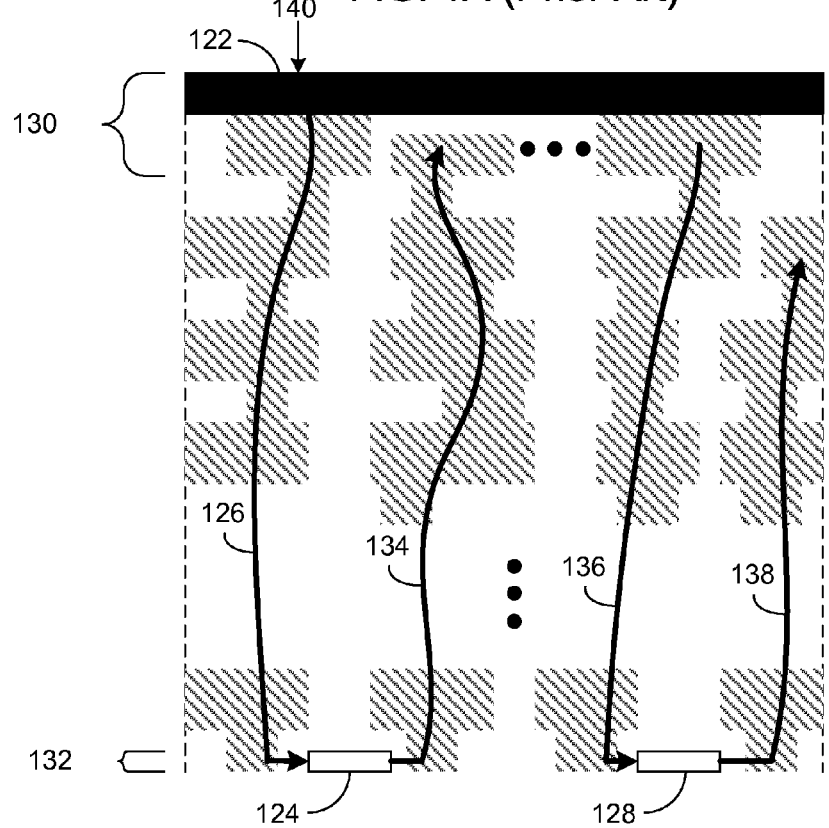
FIG. 1B illustrates a cross-section of a prior art multi-level interconnect structure of an integrated circuit.

As compared to the power segmentation architecture of FIG. 1B, it can be seen that the number of vertical interconnect structures that are traversed by operational power signals 224-228 is reduced by at least one, since only a single interconnect structure, e.g., 206, need be traversed by operational power signal 224 to provide operational power to the corresponding logic device segment 218. The power segmentation architecture of FIG. 1B, on the other hand, instead requires that the interconnect structure associated with signal path 126 first be traversed, so that switching component 124 may be utilized to programmably propagate the operational power signal to other logic segments that are electrically coupled to signal path 134 as required by the power segmentation topology.

As discussed above, the implementation of power switching components 212-216 may be performed within external interconnect portion 202, thereby preserving semiconductor die area within semiconductor device implementation portion 204 for the implementation of logic device segments 218-222 of a functional design. The power segmentation architecture of FIG. 1B, on the other hand, instead requires that power switching components 124 and 128 be incorporated with other logic core components of a functional design within semiconductor device implementation portion 132, thereby increasing the complexity and cost.

In alternate embodiments according to the present invention, external interconnect portion 202 does not share the same semiconductor die with semiconductor device implementation portion 204. Instead, power switching components 212-216 are completely removed from the semiconductor die that is subject to power segmentation and are either implemented as a SIP integration or otherwise mounted to a surface of the semiconductor die that is subject to power segmentation.

Figure 3A:
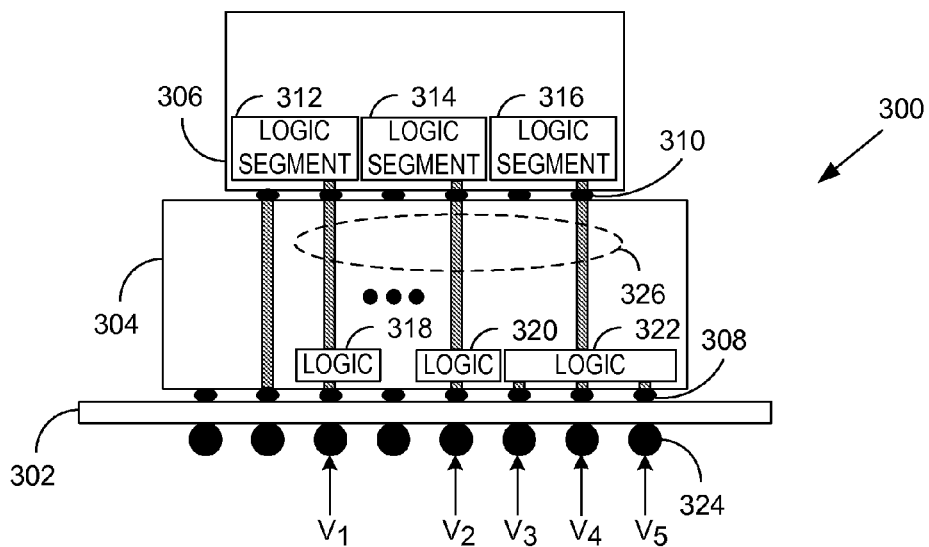
FIG. 3A illustrates a system-in-package integration having reduced power segmentation interconnect in accordance with another embodiment of the present invention.

Turning to FIG. 3A, an alternate embodiment is exemplified, whereby a SIP integration approach is taken to separate the power switching components utilized within the power segmentation architecture from the semiconductor die that is subject to the power segmentation. Stacked-die package 300 is illustrated, for example, whereby one or more flip-chip packages may be assembled using, e.g., micro-bump interconnection. In particular, the active side of stacked die 306 contains an array of pads upon which solder bumps 310 are attached. Base die 304 similarly contains a corresponding array of pads, which electrically combine with solder bumps 310 to form the interconnection between stacked die 306 and base die 304.

Base die 304 also contains an array of pads upon which solder bumps 308 are attached. Package substrate 302 similarly contains a corresponding array of pads, which electrically combine with solder bumps 308 to form the interconnection between base die 304 and package substrate 302. Package substrate 302 also provides the required interconnect structure so as to interconnect solder bumps 308 with ball grid array 324 of stacked-die package 300. Ball grid array 324 is then used to interconnect stacked-die package 300 to a circuit board (not shown) in order to facilitate signal exchange between stacked die 306, base die 304, package substrate 302 and the signal trace layers (not shown) of the circuit board.

Operational power signals, e.g., $V_1$-$V_5$, for example, may be received by the global power signal input pads that are associated with ball grid array 324. The corresponding logic components 318-322, respectively, may then be coupled to receive the operational power signals, $V_1$-$V_5$, from the global power signal input pads. Logic components 318-322 may then be programmably configured to propagate the operational power signals to the respective through-die vias 326. Conversely, logic components 318-322 may be programmably configured to prohibit the operational power signals from propagating to the respective through-die vias 326. As can be seen, any of logic components 318-322, e.g., logic component 322, may also be configured to receive two or more operational power signals.

By programmably configuring (via control signals not shown) logic components 318-322 to either propagate, or prohibit the propagation of, operational power signals to the respective through-die vias 326, power segmentation may be implemented within stacked die 306 accordingly. That is to say, in other words, that a plurality of logic segments 312-316 may be implemented within stacked die 306 and may be programmably selected to receive operational power from logic components 318-322, respectively, in accordance with the particular power segmentation algorithm being implemented.

It can be seen by inspection that the SIP integration illustrated in FIG. 3A facilitates the separation of power switching components utilized within the power segmentation architecture, e.g., logic components 318-322, from the semiconductor die that is subject to the power segmentation, e.g., stacked die 306. As a result, the cost of implementing the power switching components of logic components 318-322 is reduced, since semiconductor process techniques used to implement power switching components within base die 304 are not required to be mixed with those semiconductor process techniques used to implement logic segments 312-316 within stacked die 306.

Figure 3B:
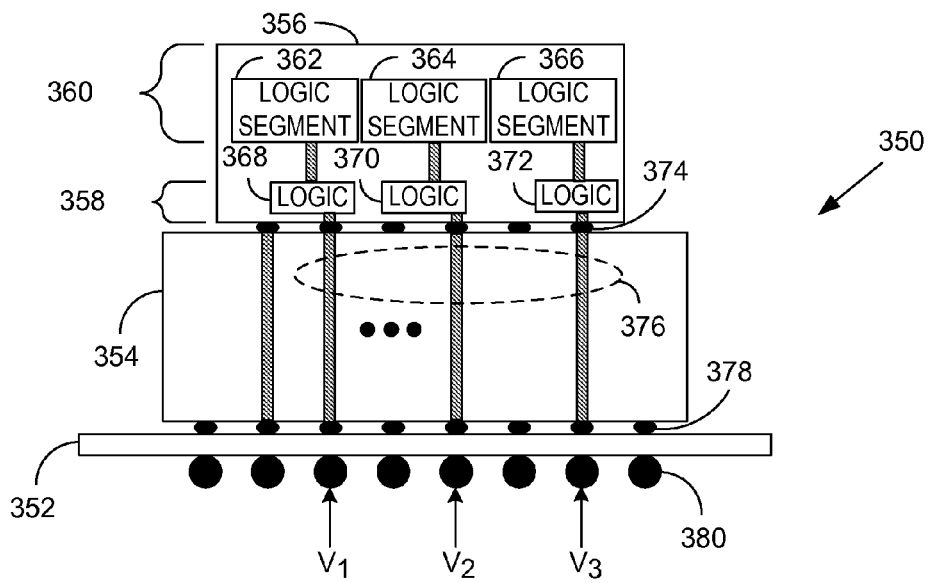
FIG. 3B illustrates a system-in-package integration having reduced power segmentation interconnect in accordance with an alternate embodiment of the present invention.

In an alternate embodiment, a SIP integration approach, as opposed to the single-chip approach discussed above in relation to FIG. 2, may instead be utilized to include the power switching components within the semiconductor die that is subject to the power segmentation. Turning to FIG. 3B, for example, stacked-die package 350 is illustrated, whereby one or more flip-chip packages may be assembled using, e.g., micro-bump interconnection to implement a SIP integration.

In particular, external interconnect portion 358 of stacked die 356 contains an array of pads upon which solder bumps 374 are attached. Base die 354 similarly contains a corresponding array of pads, which electrically combine with solder bumps 374 to form the interconnection between stacked die 356 and base die 354. Base die 354 also contains an array of pads upon which solder bumps 378 are attached. Package substrate 352 similarly contains a corresponding array of pads, which electrically combine with solder bumps 378 to form the interconnection between base die 354 and package substrate 352. Package substrate 352 also provides the required interconnect structure so as to interconnect solder bumps 378 with ball grid array 380 of stacked-die package 350. Ball grid array 380 is then used to interconnect stacked-die package 350 to a circuit board (not shown) in order to facilitate signal exchange between stacked die 356, base die 354, package substrate 352 and the signal trace layers (not shown) of the circuit board.

Operational power signals, e.g., $V_1$-$V_3$, for example, may be received by the global power signal input pads that are associated with ball grid array 380. The corresponding logic components 368-372, respectively, may then be coupled to receive the operational power signals, $V_1$-$V_3$, from the global power signal input pads using through-die vias 376. Logic components 368-372 may then be programmably configured (via control signals not shown) to propagate the operational power signals to the respective logic segments 362-366 implemented within semiconductor device implementation portion 360 of stacked die 356. Conversely, logic components 368-372 may be programmably configured to prohibit the operational power signals from propagating to the respective logic segments 362-366.

By programmably configuring logic components 368-372 to either propagate, or prohibit the propagation of, operational power signals to the respective logic segments 362-366, power segmentation may be implemented within stacked die 356 accordingly. That is to say, in other words, that a plurality of logic segments 362-366 may be implemented within stacked die 356 and may be programmably selected to receive operational power from logic components 368-372, respectively, in accordance with the particular power segmentation algorithm being implemented.

It can be seen by inspection that the SIP integration illustrated in FIG. 3B facilitates the inclusion of power switching components, e.g., logic components 368-372, within the semiconductor die that is subject to the power segmentation, e.g., stacked die 356. However, since power switching components 368-372 are implemented within external interconnect portion 358 and since logic segments 362-366 are implemented within semiconductor device implementation portion 360, semiconductor processing difficulty may be similarly reduced, thereby decreasing semiconductor processing costs associated with stacked die 356.

Figure 4:
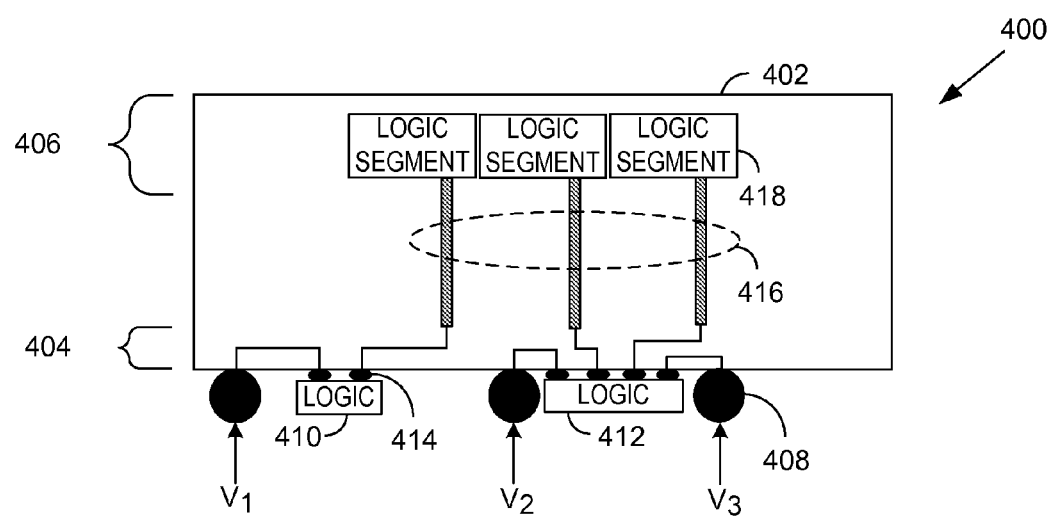
FIG. 4 illustrates a discrete implementation of power switching components to reduce the power segmentation interconnect within an integrated circuit in accordance with another embodiment of the present invention.

Alternate embodiments exist, whereby the power switching components may be separated from the semiconductor die that is subject to power segmentation, but the SIP integration as discussed above in relation to FIG. 3A is not taken. Turning to FIG. 4, for example, a power segmentation implementation is illustrated, whereby the power switching components may be discrete switching components that are included within the semiconductor die package or otherwise mounted to a surface of the semiconductor die that is subject to power segmentation. In such instances, the power switching components may be discretely implemented by programmable switching components, such as a transistor or a micro-miniature switch, e.g., a microelectromechanical system (MEMS) relay/switch.

Semiconductor die package 400 is illustrated, for example, whereby one or more discrete power switching components 410-412 may be attached to semiconductor die 402 using, e.g., solder-bump interconnection 414. In particular, external interconnect portion 404 contains an array of pads upon which solder bumps 414 are attached. Discrete power switching components 410-412 similarly contain a corresponding array of pads, which electrically combine with solder bumps 414 to form the interconnection between discrete power switching components 410-412 and semiconductor die 402. In one embodiment, discrete power switching components 410-412 may be attached to semiconductor die 402 between ball grid array components 408.

Operational power signals, e.g., $V_1$-$V_3$, for example, may be received by ball grid array 408. The corresponding discrete power switching components 410-412 may then be coupled to receive the operational power signals, $V_1$-$V_3$, from ball grid array 408 via the interconnect formed within external interconnect portion 404. Discrete power switching components 410-412 may then be programmably configured (via control signals not shown) to propagate the operational power signals to the respective through-die vias 416. Conversely, discrete power switching components 410-412 may be programmably configured to prohibit the operational power signals from propagating to the respective through-die vias 416.

By programmably configuring discrete power switching components 410-412 to either propagate, or prohibit the propagation of, operational power signals to the respective through-die vias 416, power segmentation may be implemented within semiconductor die 402 accordingly. That is to say, in other words, that a plurality of logic segments 418 may be implemented within semiconductor device implementation portion 406 of semiconductor die 402 and may be programmably selected to receive operational power from discrete power switching components 410-412, respectively, in accordance with the particular power segmentation algorithm being implemented.

Figure 5:
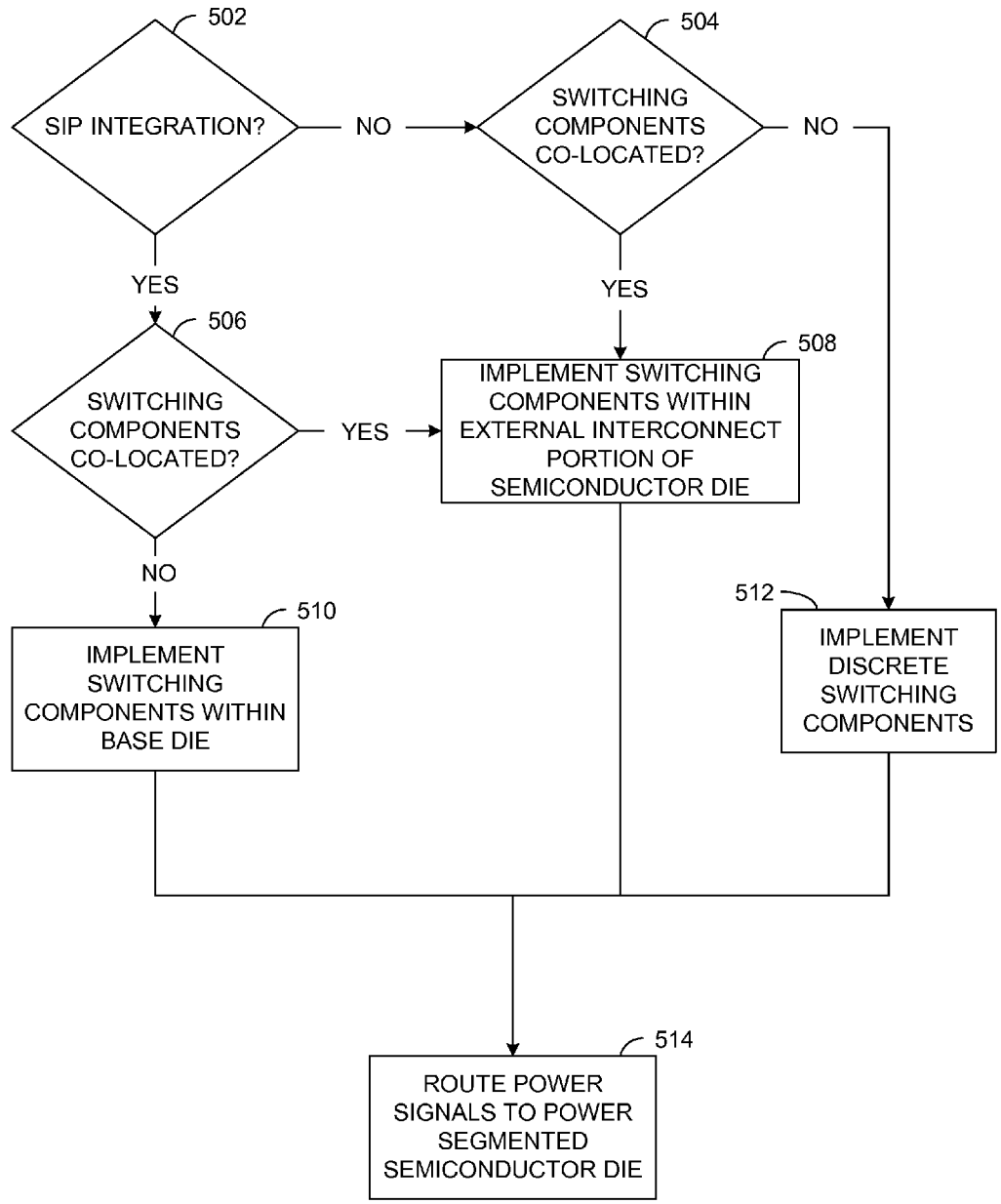
FIG. 5 exemplifies a flow diagram of a method of implementing reduced interconnect power segmentation in accordance with one embodiment of the present invention.

Turning to FIG. 5, a flow diagram of a method of implementing reduced interconnect power segmentation overhead is illustrated in accordance with the various embodiments of the present invention. In steps 502-504 and 508, for example, it is determined that power switching components are to be configured as a non-SIP integration, i.e., configured as a single integrated circuit package, within less densely populated areas of a multi-layer semiconductor die. As such, realization of power switching components, e.g., power switching components 212-214 of FIG. 2, becomes less difficult and commensurately less costly to implement due to their implementation within external interconnect portion 202 as opposed to their implementation within semiconductor device implementation portion 204. Semiconductor die area previously utilized for the power switching components is, therefore, simultaneously reallocated to core logic segments 218-222 of the functional design of IC 200. In addition, the revised location of power switching components 212-214 reduces the number of inter-layer interconnects that must be traversed in order to programmably supply operational power to the various logic segments of the IC.

If the power switching components are not to be co-located with the semiconductor die that is subject to power segmentation, then the power switching components are implemented as discrete switching components in step 512. The power switching components are included within the semiconductor die package or otherwise mounted to a surface of the semiconductor die that is subject to power segmentation as discussed above in relation to FIG. 4. In such instances, for example, power switching components 410-412 may be discretely implemented using field effect transistors (FETs) or micro-miniature switches, e.g., microelectromechanical system (MEMS) relays or switches.

In steps 502 and 506-508, on the other hand, it may be determined that power switching components are to be configured as a SIP integration within less densely populated areas of a multi-layer stacked die, such as external interconnect portion 358 as discussed above in relation to FIG. 3B. Stacked die 356 implements the power switching functions that facilitate the power segmentation within stacked die 356, where the global power supply inputs are received from base die 354 using through-die vias (TDVs) 376 contained within base die 354.

In step 510, on the other hand, a SIP integration approach may be taken, whereby the power switching components utilized within the power segmentation architecture are removed from the semiconductor die that is subject to power segmentation as discussed above in relation to FIG. 3A. In such instances, a multi-chip package is implemented whereby stacked die 306 that is subject to power segmentation receives operational power from power switches 318-322 that are implemented within base die 304.

Once implemented, the power switching functions facilitate power segmentation within the semiconductor die that is subject to power segmentation as in step 514. Should the semiconductor die that is subject to power segmentation be used to implement a programmable logic device (PLD), such as a field programmable gate array (FPGA), then certain non-configured logic portions within the FPGA do not require operational power. As such, the respective power switches may be made non-conductive using, e.g., configuration memory cells or user logic, to deprive the non-configured logic portions contained within the FPGA of operational power. In particular, operational power signals provided to the power switches are not propagated to the non-configured logic portions of the FPGA in response to the logic values of the configuration memory cells or the user logic.

Alternately, the semiconductor die may used to implement an IC that exhibits a "power-save" mode, such that portions of the IC may be deprived of operational power during the power-save mode. As such, the respective power switches may be programmed to a non-conductive state to prohibit propagation of the received operational power signal to various portions of the IC, thereby reducing power consumption.

Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A semiconductor die package, comprising:
   a plurality of power switching components coupled to receive operational power signals and configured to selectively provide the operational power signals in response to a corresponding plurality of control signals;
   a first semiconductor die, the first semiconductor die having a first major surface and a second major surface opposite from the first major surface; and
   a plurality of device segments, the plurality of device segments coupled to the plurality of power switching components and configured to perform functions in response to receiving the selectively provided operational power signals;
   wherein the plurality of power switching components is closer to the first major surface of the first semiconductor die than the second major surface of the first semiconductor die, and wherein the plurality of device segments is closer to the second major surface of the first semiconductor die than the first major surface of the first semiconductor die;
   wherein the plurality of power switching components is implemented in an external interconnect portion of the first semiconductor die, and the plurality of device segments is implemented in a semiconductor device implementation portion of the first semiconductor die.

2. The semiconductor die package of claim 1, wherein the plurality of power switching components is implemented within the first semiconductor die.

3. The semiconductor die package of claim 1, wherein the plurality of power switching components are discrete power switching components.

4. The semiconductor die package of claim 3, wherein the discrete power switching components are implemented by a transistor or a micro-miniature switch.

5. The semiconductor die package of claim 1, wherein the plurality of power switching components are configured to prohibit the operational power signals from being provided to at least some of the plurality of device segments while the at least some of the plurality of device segments are in a non-configured state.

6. The semiconductor die package of claim 1, wherein the plurality of power switching components is connected to an external interconnect portion of the first semiconductor die, and the plurality of device segments is implemented in a semiconductor device implementation portion of the first semiconductor die.

7. The semiconductor die package of claim 1, wherein the plurality of power switching components is connected to an external interconnect portion of the first semiconductor die, and the plurality of device segments is implemented in a semiconductor device implementation portion of the first semiconductor die.

8. The semiconductor die package of claim 1, further comprising a second semiconductor die, wherein the plurality of power switching components is connected to bumps between the first semiconductor die and the second semiconductor die.

9. The semiconductor die package of claim 1, wherein the plurality of power switching components are configured to prohibit the operational power signals from being provided to at least some of the plurality of device segments during a power-save mode.

10. A method of reducing power segmentation overhead within a semiconductor die package having a first semiconductor die, the first semiconductor die having a plurality of device segments, the method comprising:
    providing a plurality of power switching components in the semiconductor die package, wherein the first semiconductor die has a first surface and a second surface opposite from the first surface;
    wherein the plurality of power switching components is provided in an external interconnect portion of the first semiconductor die, and the plurality of device segments is provided in a semiconductor device implementation portion of the first semiconductor die;
    wherein the plurality of power switching components is closer to the first major surface of the first semiconductor die than the second major surface of the first semiconductor die, and wherein the plurality of device segments is closer to the second major surface of the first semiconductor die than the first major surface of the first semiconductor die;
    obtaining a plurality of control signals;
    receiving operational power signals by the plurality of power switching components; and
    selectively providing the operational power signals to the plurality of device segments in response to the plurality of control signals.

11. The method of claim 10, wherein the operational power signals are received by the plurality of power switching components from an external power supply.

12. The method of claim 10, wherein the act of selectively providing the operational power signals to the plurality of device segments is performed using non-conductive attributes of the power switching components.

13. The method of claim 12, wherein the act of selectively providing the operational power signals to the plurality of device segments is performed by configuring a transistor or a micro-miniature switch of the power switching components.

14. The method of claim 10, further comprising prohibiting the operational power signals from being provided to at least some of the plurality of device segments while the at least some of the plurality of device segments are in a non-configured state.

15. The method of claim 10, wherein the plurality of power switching components is provided within the first semiconductor die.

16. The method of claim 10, wherein the semiconductor die package further comprises a second semiconductor die, and wherein the plurality of power switching components is connected to bumps between the first semiconductor die and the second semiconductor die.

17. The method of claim 10, further comprising prohibiting the operational power signals from being provided to at least some of the plurality of device segments during a power-save mode.

18. A semiconductor die package, comprising:

a plurality of power switching components coupled to receive operational power signals and configured to selectively provide the operational power signals in response to a corresponding plurality of control signals;

a first semiconductor die, the first semiconductor die having a first major surface and a second major surface opposite from the first major surface; and a plurality of device segments, the plurality of device segments coupled to the plurality of power switching components and configured to perform functions in response to receiving the selectively provided operational power signals;

wherein the plurality of power switching components is closer to the first major surface of the first semiconductor die than the second major surface of the first semiconductor die, and wherein the plurality of device segments is closer to the second major surface of the first semiconductor die than the first major surface of the first semiconductor die; and a second semiconductor die, wherein the plurality of device segments is at the second semiconductor die and is connected to bumps between the first semiconductor die and the second semiconductor die.

* * * * *